United States Patent
Howry et al.

(10) Patent No.: US 9,756,037 B2
(45) Date of Patent: Sep. 5, 2017

(54) LAYERED CERTIFICATION

(71) Applicant: InterDigital Patent Holdings, Inc., Wilmington, DE (US)

(72) Inventors: Dolores F. Howry, Malvern, PA (US); Yogendra C. Shah, Exton, PA (US); Alec Brusilovsky, Downington, PA (US); Joseph Gredone, Chalfont, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/031,496

(22) Filed: Sep. 19, 2013

(65) Prior Publication Data
US 2014/0082352 A1    Mar. 20, 2014

Related U.S. Application Data

(60) Provisional application No. 61/703,098, filed on Sep. 19, 2012, provisional application No. 61/838,740, filed on Jun. 24, 2013.

(51) Int. Cl.
*H04L 29/06* (2006.01)
*H04L 9/32* (2006.01)
(Continued)

(52) U.S. Cl.
CPC .......... *H04L 63/0823* (2013.01); *G06F 21/57* (2013.01); *G06F 21/575* (2013.01);
(Continued)

(58) Field of Classification Search
CPC . H04L 63/0823; H04L 9/3265; H04L 63/126; H04L 63/08; G06F 21/57; G06F 21/575; H04W 12/00
(Continued)

(56) References Cited

U.S. PATENT DOCUMENTS 6,167,521 A * 12/2000 Smith et al. ............... 726/21
8,886,929 B2   11/2014 Smith et al.
(Continued)

FOREIGN PATENT DOCUMENTS

CN    10-2396251 A    3/2012
WO    WO 2010-121020 A1    10/2010

OTHER PUBLICATIONS

Bryan Parno et al, "Bootstrapping Trust in Commodity Computers", Security and Privacy IEEE Symposium, Piscataway. NJ. USA. May 16, 2010, 414-429.
(Continued)

*Primary Examiner* — Michael Pyzocha
(74) *Attorney, Agent, or Firm* — Baker & Hostetler LLP

(57) ABSTRACT

A certification provenance tree (CPT) structure may provide information concerning a layered certification of a device that comprises a hierarchy of components. The CPT structure may include a hierarchy of secure certification provenance document (SCPD) structures. Each SCPD structure in the hierarchy may represent a given component at a given level of the hierarchy of components of the device. Each SCPD structure may include a field that stores a certification proof indicating that security properties of the given component have been certified by a certification authority. An SCPD structure may further include accreditation information fields that store a pointer to an SCPD structure of a component at a next layer of the hierarchy of components of the device. The pointer may provide an indication of assurance that the component at that next layer will perform securely within this component at said given layer.

8 Claims, 7 Drawing Sheets

(51) Int. Cl.
*G06F 21/57* (2013.01)
*H04W 12/00* (2009.01)

(52) U.S. Cl.
CPC ........... *H04L 9/3265* (2013.01); *H04W 12/00* (2013.01); *H04L 63/08* (2013.01); *H04L 63/126* (2013.01)

(58) Field of Classification Search
USPC ....................................................... 713/157
See application file for complete search history.

(56) References Cited

U.S. PATENT DOCUMENTS

| | | | |
|---|---|---|---|
| 2002/0099958 A1* | 7/2002 | Hrabik et al. ................ | 713/201 |
| 2003/0084138 A1* | 5/2003 | Tavis et al. .................. | 709/223 |
| 2007/0230504 A1* | 10/2007 | Smith et al. .................. | 370/469 |
| 2010/0058317 A1* | 3/2010 | Braams ......................... | 717/171 |
| 2010/0161998 A1* | 6/2010 | Chen et al. ................... | 713/189 |
| 2010/0303230 A1* | 12/2010 | Taveau et al. ................. | 380/30 |
| 2011/0004895 A1* | 1/2011 | Ladd et al. ..................... | 725/31 |
| 2011/0099361 A1* | 4/2011 | Shah .................... | H04W 12/10 |
| | | | 713/2 |
| 2011/0173643 A1* | 7/2011 | Nicolson et al. ............. | 719/328 |
| 2012/0166781 A1* | 6/2012 | de Cesare et al. ............ | 713/1 |
| 2013/0198838 A1* | 8/2013 | Schmidt et al. ............... | 726/22 |

OTHER PUBLICATIONS

Garfinkel T, "Terra: A Virtual Machine-Based Platform for Trusted Computing" ACM SOSP. Proceedings of the ACM Symposium on operating systemsprinciples; Oct. 19, 2003, Oct. 22, 2003, 193-206.
Chinese Application No. 2013-80055607.3: First Office Action with Search Report dated Oct. 9, 2016, 19 pages.

* cited by examiner

LAYERED CERTIFICATION

CROSS-REFERENCE TO RELATED APPLICATIONS

This application claims the benefit of U.S. Provisional Application No. 61/703,098, filed Sep. 19, 2012, and U.S. Provisional Application No. 61/838,740, filed Jun. 24, 2013, the disclosures of both of which are hereby incorporated by reference as if set forth in their entireties herein.

BACKGROUND

In order to access services from service providers and mobile network operators, mobile devices generally provide trust assurances of their platforms to operators and service providers. Often mobile devices provide only a black box view to an operator. For example, an operator may receive a trust assurance associated with a mobile device, but the operator may not be informed as to how the trust assurance was derived or how it can be verified. The diversity of platform architectures and time constraints of mobile device deployment cycles may make some conventional white box device testing impractical because of the times associated with conventional certification of end platforms. Thus, current approaches to establishing trust of a mobile device lack efficiencies and capabilities, at least in part because of the wide variety of mobile devices and diversity of platforms that the mobile devices support.

SUMMARY

Systems, methods, and apparatus embodiments are described herein for layered certification in which individual components, which may be used to build a secure mobile platform or network element platform, are certified and accredited for use in a system in a hierarchical fashion. In an example embodiment, a certificate provenance tree (CPT) structure is stored on a computer-readable medium. The CPT structure provides information concerning a layered certification of a device that comprises a hierarchy of components. The CPT structure comprises a hierarchy of secure certification provenance document (SCPD) structures. Each SCPD structure may represent a given component at a given level of the hierarchy of components of the device. Each SCPD structure comprises a first field that stores a certification proof indicating that security properties of the given component have been certified by a certification authority. Each SCPD structure further comprises zero or more accreditation information fields. Each accreditation information field stores a pointer to an SCPD structure of a component at a next layer of the hierarchy of components of the device and provides an indication of assurance that the component at that next layer will perform securely within this component at said given layer.

In accordance with another example embodiment, security properties of a device are evaluated. A certification provenance tree structure for the device is obtained. The certification provenance tree structure comprises a hierarchy of secure certification provenance document (SCPD) structures. Each SCPD structure represents a given component at a given level of the hierarchy of components of the device. Each SCPD structure comprises a first field that stores a certification proof indicating that security properties of the given component have been certified by a certification authority. Each SCPD structure further comprises zero or more accreditation information fields. Each accreditation information field stores a pointer to an SCPD structure of a component at a next level of the hierarchy of components of the device and provides an indication of assurance that the component at that next level will perform securely within this component at said given level. In accordance with the example embodiment, the hierarchy of SCPD structures is traversed using the pointers until the device is verified or until a security exception is discovered. For example, a mobile network operator that controls a network or another certification entity may traverse the hierarchy of the SCPD structures using the pointers until the security properties of the device are verified, and in response to verifying the device, the mobile network operator may grant the device access to the network.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
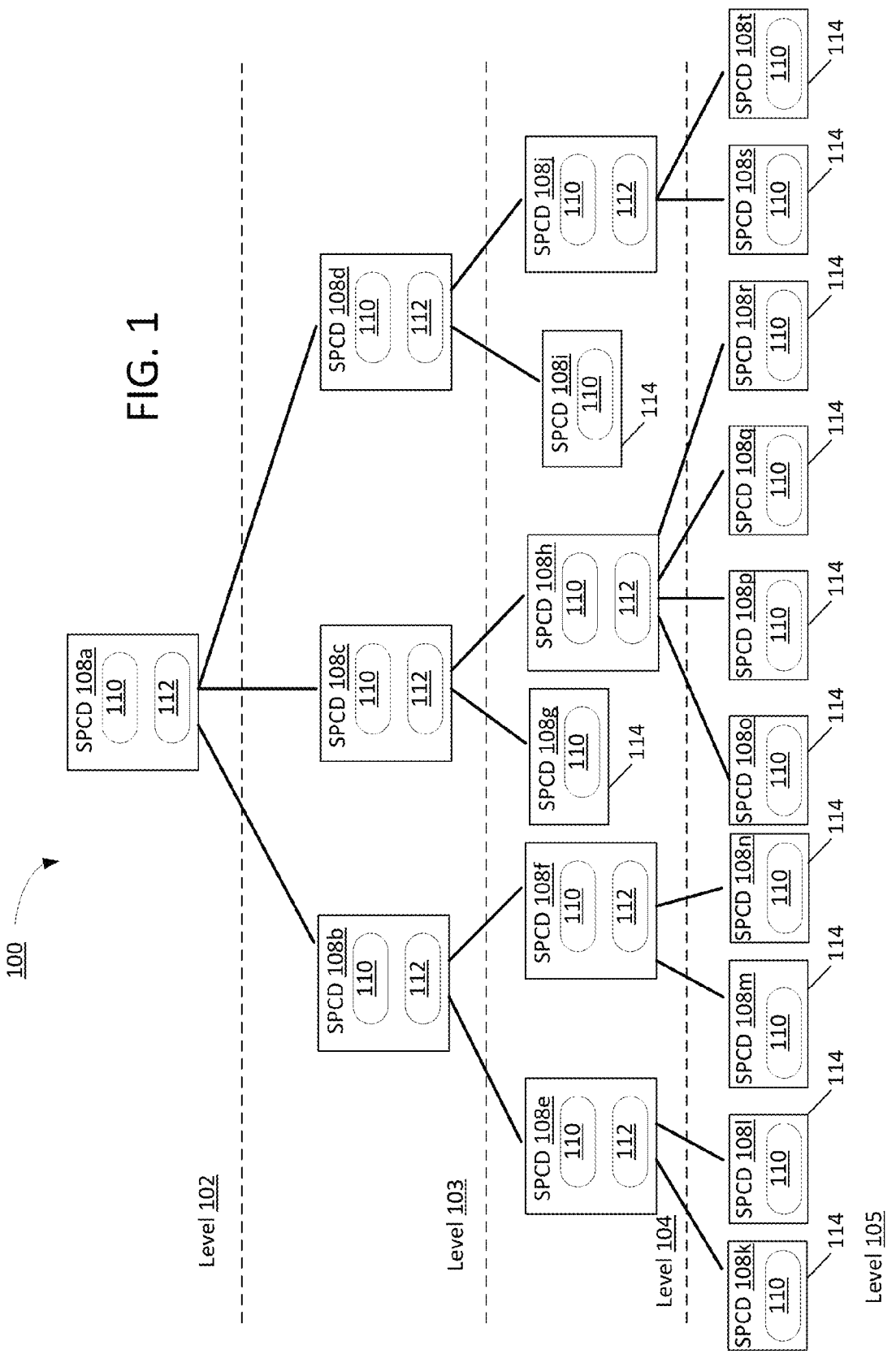
FIG. 1 depicts a diagram of a Certification Provenance Tree (CPT) structure that comprises security information about a device in accordance with an example embodiment.

The ensuing detailed description is provided to illustrate exemplary embodiments and is not intended to limit the scope, applicability, or configuration of the invention. Various changes may be made in the function and arrangement of elements and steps without departing from the spirit and scope of the invention.

With increased attacks on mobile devices and the networks which serve them (e.g., to gain information that can lead to financial benefit to an attacker), it is desirable to strengthen the security of mobile devices and the components that make up the communications networks. At a high level, it is desirable to be able to externally assess a level of trust that can be placed on a device or on a network node. For example, mobile devices and network nodes may have to provide, to mobile network operators or service providers, assurance of the trustworthiness of their platforms to access services that are provided by the mobile network operators and service providers. Various methods of trust assessment have been studied and implemented in industry. However, existing approaches to establishing trust can be costly, time consuming, and inefficient.

Systems, methods, and apparatus embodiments are described herein for layered certification in which individual components, which may be used to build a secure mobile device or a network element platform for example, are certified and/or accredited for use in a system in a hierarchical fashion. As used herein, unless otherwise stated, the term certification refers to the comprehensive technical evaluation of security components and their properties in a generic deployment environment. As used herein, unless otherwise stated, the term accreditation refers to a process that results in an assurance that a given system component performs securely within a given (defined) deployment environment. Layered certification may refer to the certification and accreditation of a device by certifying and accrediting device components that are arranged in a hierarchy. For example, a device platform may comprise a set of hardware (HW) and software (SW) components, and layered certification may begin with the certification of the core architectural component for the device's platform security. In one embodiment, the core architectural component for the device's platform security includes a trust module, and the certification of the trust module can be executed prior to and independent from the design of the device. For example, independent hardware testing and certification may create a white box view of the security of the trust module, and hardware certification may be executed in parallel with or in combination with software certification.

While a component of a device can be certified to a given protection level, the certification of the component does not necessarily mean that the component will perform securely within a given deployment environment (e.g., a given device). Thus, in accordance with one example embodiment, the certification is layered such that manufacturers or other parties can accredit certified components in an operating platform to build new platforms. For example, each component/layer may undergo a specific certification process that may be accredited to a subsequent layer of integration, and each subsequent layer may represent a new environment for certification and/or accreditation (e.g., see FIG. 4). Thus, a component may be validated as secure if it has been certified at least once, but the component may have to be accredited at least once in a given deployment environment for the component to be validated as secure within the given deployment environment. For example, accreditation may lead to an official acceptance of the information in the certification for a given deployment environment. The combinations of various certification and accreditation processes may enable rapid product development, for example, thereby shortening time to market and limiting associated costs.

While embodiments are generally described below with reference to security certification/validation of user equipment (UE) devices, it will be understood that the described certification/validation methods may be applied to any appropriate network nodes or complex devices as desired. For example, such network nodes and complex devices may consist of multiple components which may have been previously and independently certified. Further, it will be understood that embodiments are not limited to security certification/validation, and may be applied to other certifications/validations (e.g., functional, safety) as desired.

As described herein, a secure mobile device may provide external stakeholders, such as mobile network operators for example, with trust assurance via a white box view into the internal security architecture of the mobile device. The trust assurance may be traceable to trusted third parties. In one embodiment, a high level of trust assurance is achieved through defined trust evaluation, certification, and accreditation processes for hardware, software, or any appropriate combination thereof. Existing approaches to mobile security models provide only a black box view. Further, the diversity of platform architectures may make conventional white box device testing impractical. For example, lengthy times associated with the certification of mobile phone platforms, together with the associated costs, may make conventional white box approaches impractical. Thus, in an example embodiment described herein, security assurances associated with white box testing are enabled within time constraints of mobile phone deployment cycles while maintaining low costs.

Personal computers, mobile devices, or the like may be required to provide trust assurances of their platforms to mobile network operators and service providers, for example, in order to receive access to secure services provided by the operators and the service providers. Mobile platforms may use a software version of a trusted platform module (TPM) that may implement a Secure Execution Environment (SEE) of a Trusted Execution Environment (TEE). Such a SEE or TEE may operate in substantially the same manner as a hardware trusted platform module (TPM). The SEE or trusted environment may store sensitive information and may securely separate critical functionality from other portions of the mobile platform. A mobile trust module (TrM) comprises hardware, software, or a combination thereof to create a trusted environment. In an example embodiment, establishing trust of a mobile platform begins with a secure boot process anchored on a hardware root of trust. The root of trust may enable subsequent layers of the platform to be verified and loaded on underlying layers of the platform, for example, in order to create a platform that is trustworthy.

Mobile devices may include trust modules, which may be referred to as a trusted execution environment (TEE), that may be located within a chipset of the device, which may be referred to as a system on a chip (SoC). The diversity of mobile platforms and the variety of processor architectures that may be implemented in a device present challenges to providing a white box view of a trusted environment for each individual platform. For example, a specific processor architecture can be the basis for multiple SoCs, which in turn can be the foundational block for multiple diverse mobile platforms from a variety of original equipment manufacturers (OEMs). For example, the Qualcomm Snapdragon S4 architecture consists of approximately 13 SoCs, and each SOC may support one or more OEMs.

Referring to FIG. 1, in accordance with the illustrated embodiment, through a process of certifications and accreditations, the security of an endpoint device may be assessed using a hierarchical trust assessment tree structure 100, which can also be referred to as a certification provenance tree (CPT) structure 100. In accordance with the illustrated embodiment, the certification provenance tree structure 100 provides information concerning a layered certification of the device that comprises a hierarchy of components. The hierarchy of components may include hardware components, software components, or any appropriate combination thereof. As described below, in accordance with the one example embodiment, the CPT structure 100 is evaluated from a top layer 102 toward a bottom layer 106, to determine whether the device that the CPT structure 100 represents is trustworthy. The CPT structure 100 further includes middle layers 103 and 104. The layers 102, 103, 104, and 106 may also be referred to as levels. While the illustrated CPT structure includes four layers (levels), it will be understood that a CPT structure may include any number of layers as desired.

With continuing reference to FIG. 1, in accordance with the illustrated embodiment, the hierarchical CPT structure 100 includes a hierarchy of secure certification provenance document (SCPD) structures 108. Each SCPD structure 108 represents a given component at a given level of the hierarchy of components of the device. Each SCPD structure 108, which can also be referred to as a node 108 in the CPT structure 100, is cryptographically bound to at least one other node 108 in the tree, for example, such that the nodes 108 in the CPT structure 100 can be traced back to a source certification. An SCPD structure 108a that is disposed at the top layer 102, and thus at the top of the hierarchy, may define a root SCPD structure 108a. Further, in accordance with the illustrated embodiment, the SCPD structures 108 that are below a select SCPD structure in the hierarchy and are cryptographically bound to that SCPD structure represent subcomponents of the component that the select SCPD structure represents. For example, referring to the CPT structure 100 illustrated in FIG. 1, the SCPD structure 108b is cryptographically bound to the SCPD structures 108e and 108f, which is indicated by the lines connecting the SCPD structure 108b to the SCPD structures 108e and 108f. Further, the SCPD structures 108e and 108f are below the SCPD structure 108b in the hierarchy, thus the SCPD structures 108e and 108f represent the subcomponents that define the component that the SCPD structure 108b represents. By way of further example, the root SCPD structure 108a may represent a portion, for example the entire mobile platform, of the device.

In accordance with the illustrated embodiment, each SCPD structure 108 comprises a certification field 110, which may also be referred to as a first field 110, that stores a certification proof indicating that security properties of the given component (that the SCPD structure represents) have been certified by a certification authority. The SCPD structures 108 may further comprise accreditation information fields 112. A plurality of SCPD structures may each define end SCPD structures 114 that have not been accredited and/or do not include accreditation information fields 112. For example, in accordance with the illustrated embodiment, end SCPD structures 114, which may be referred to as end nodes 114 or leaves 114, do not include accreditation information fields 112, and thus only include certification proofs. Thus, each illustrated SCPD structure 108 includes zero or more accreditation fields 112. For example, referring to the illustrated CPT structure 100 shown in FIG. 1, SCPD structures 108k-t at the bottom layer 106 and SCPD structures 108g and 108i at the middle layer 104 include zero accreditation fields 114, and thus the SCPD structures 108k-t, 108g, and 108i may represent device components that do not have any subcomponents with pre-certifications to re-use. Thus, the nodes 108k-t, 108g, and 108i may also be referred to as lowest level nodes.

The SCPD structures 108 may allow the security capability of each device component to be cryptographically assessed. For example, in accordance with an example embodiment, each node's identifier is cryptographically bound to that node's certification proof Further, the node's certification proof may point to the node's accreditation information that is stored at a subsequent layer of the CPT structure 100, as further described below with reference to FIG. 2. Thus, the lowest level nodes in the CPT structure 100 (e.g., SCPD structures 108k-t, 108g, and 108i) may include basic security properties that can be used by upper level nodes for accreditation.

In an example embodiment, the CPT structure 100 is built with the SCPD structures 108 at the time of manufacture of the device that the CPT structure 100 represents. It will be understood that the CPT structure 100 may represent any device or network entity as desired, and may further represent a portion, for example a set of components, of the device or network entity. The CPT 100 may also be updated at a later time, for example when an SCPD structure is updated. For example, an SCPD structure may be updated after a product upgrade cycle, and the updated SCPD structure may include pointers to one or more of the same underlying components that comprise the SCPD structure before it was updated.

Figure 2:
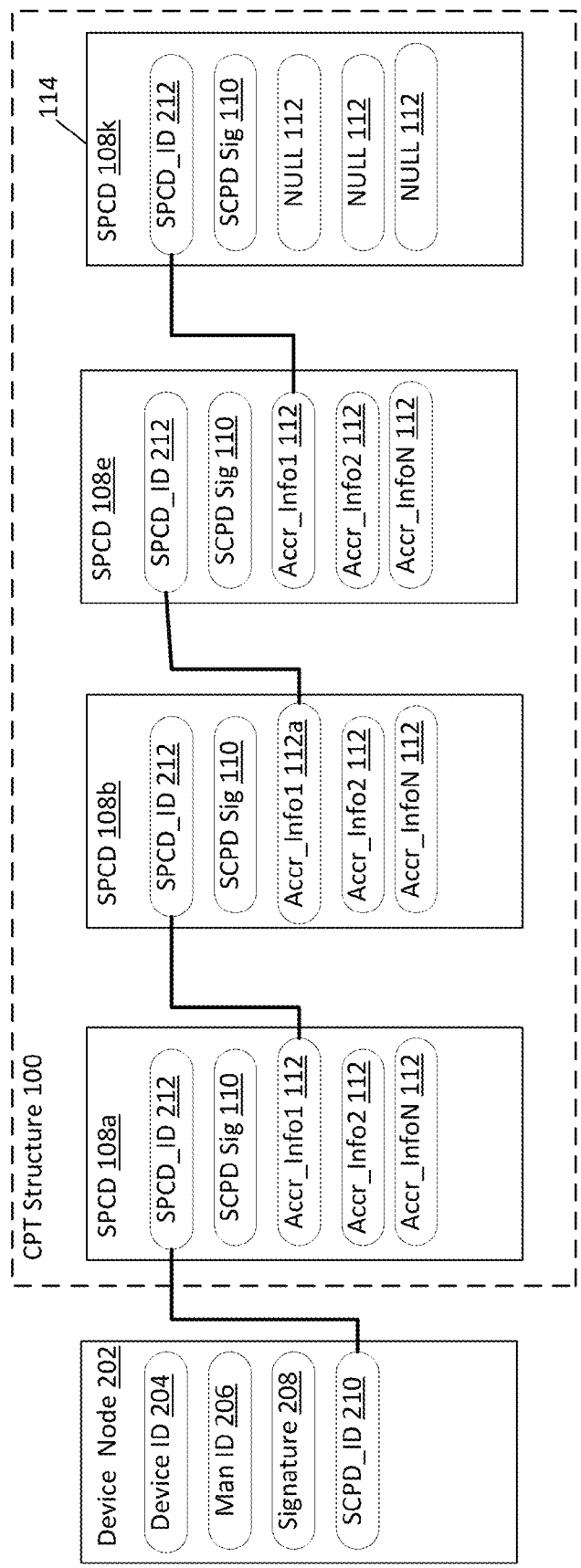
FIG. 2 is a block diagram that shows a portion of the CPT structure shown in FIG. 1, wherein example fields of nodes of the CPT structure are illustrated in accordance with an example embodiment.

FIG. 2 is a block diagram that shows how different SCPD structures 108 within the CPT structure 100 are bound together in accordance with an example embodiment. In accordance with the illustrated embodiment, a device node structure 202 is cryptographically bound to the root SCPD structure 108a. The device node structure 202 may be part of the CPT structure 100 or it may be separate from the CPT structure 100. In accordance with the illustrated embodiment, the device node structure 202 includes a first field 204 that stores an identity of the device, a second field 206 that stores an identity of a manufacturer of the device, a third field 208 that stores a device certificate signed by the manufacturer of the device or a certification authority, and a fourth field 210 that provides a pointer (SCPD_ID) to the root SCPD structure 108a that represents a root node of the hierarchy of components of the device. The pointer may include an identity of the root SCPD structure 108a and may further identify the location of the root SCPD structure 108a. In accordance with an example embodiment, the pointer, which also may be referred to as a reference, to a top most node in a CPT structure may be included as part of an extended Device Certificate (e.g., X.509) or an information bearer of similar security properties. The device node structure 202 may be implemented as, and thus referred to as, a device certificate. It will be understood that the various fields included in the device node structure 202 are illustrated by way of example, and that various other information fields may be included in the device node structure 202 as desired.

In accordance with the illustrated embodiment, the pointer in the third field 208 points to the root node 108a of the CPT structure 100, and thus points to the CPT structure 100. The pointer may be cryptographically bound to the device certificate and a public key of the device. In an example embodiment, the certificate that is signed and stored in the third field 208 may be utilized for cryptographic binding using a private key of the device or a private key of the manufacturer of the device. The private key of the manufacturer of the device may allow flexibility for validating the device certificate. As illustrated, the root SCPD structure 108a includes an identity field 212 that stores an identity of the root SCPD structure 108a. The pointer in the third field 208 of the device node structure 202 may match the identity in the identity field 212, and thus the relation between the identity field 212 in the root SCPD structure 108a and the pointer field 208 in the device node structure 202 may be a one-to-one mapping. Thus, the top node 108a of the CPT structure 100 may be related to the device node structure 202 by way of the identity of the SCPD structure 108a.

With continuing reference to FIG. 2, the SCPD structures 108 of the CPT structure 100 may be substantially identical with each other. For example, in accordance with the illustrated embodiment, each SCPD structure 108 includes the certification field 110 that stores a certification proof indicating that security properties of the given component have been certified by a certification authority. The certification proof may include a signature corresponding to the respective SCPD structure 108 signed with the private key of the manufacturer of the component that is represented by the respective SCPD structure 108. It will be understood that components represented by different SCPD structures 108 may originate from different sources and therefore be signed by different manufacturers or developers. For example, the components of a mobile device may include a main circuit board, a CPU, an SoC, or the like, that originate from different manufacturers. In an example embodiment, the SCPD structures 108 are signed by the private key of the manufacturer of the component that the respective SCPD structure 108 represents.

In accordance with the illustrated embodiment, each of the SCPD structures include the identity field 212 that stores an identity of the respective SCPD structure 108. As illustrated, the SCPD structures may further include zero or more accreditation information fields 112. Each accreditation information field 112 may store a pointer to an SCPD structure of a component at a next level of the hierarchy of components of the device and may provide an indication of assurance that the component at that next level will perform securely within this component at said given level. For example, the illustrated SCPD structure 108b includes an accreditation information filed 112a that stores a pointer (Acc_Info1) to the SCPD structure 108e. The illustrated SCPD structure 108b is located at the level 103 and the SCPD structure 108e is located at the level 104, which is the next level below level 103 in the hierarchy of the CPT structure 100. Thus, referring also to FIG. 1, at least one of the accreditation information fields 112 of the SCPD structure 108b may include a pointer (e.g., in the pointer fields 208) to the SCPD structures 108e and 108f that represent the components that have been accredited to be used in the specific environment represented by the SCPD structure 108b. For example, the accreditation fields 112 in a given SCPD structure 108 that represents a given component may include one or more identities of the SCPD data structures that represent the subcomponents of the given component. The accreditation fields 112 in a given SCPD structure 108 that represents a given component may further include an identity of an entity that accredited the use of the subcomponents in the environment of the given component. Thus, as described above, each accreditation information field 112 that represents a component at a given level may provide an indication of assurance that the component at the next level will perform securely within this component at said given level.

Further, as described above, the end nodes 114 may have zero accreditation information fields 112, which may indicate that the device components that the end nodes represent do not have any subcomponents with pre-certifications to re-use. Alternatively, the end SCPD structures 114, which can be referred to as the end nodes 114, may have NULL values in their accreditation information fields to represent that there are no further nodes. In accordance with an example embodiment, an SCPD structure 108 that includes NULL values in the accreditation fields 112 can be referred to as having zero accreditation fields 112, without limitation. Thus, end SCPD structures 114 may indicate a mapping to the root security properties information of the lowest certified component of the CPT structure 100 of the device. In accordance with the illustrated embodiment, for example, the SCPD structure 108k includes zero accreditation information fields, and thus the SCPD structure 108k may be referred to as a bottom node of the CPT structure 100.

Thus, in accordance with one embodiment, a CPT structure for providing information concerning a layered certification of a device that comprises a hierarchy of components that may be stored on a non-transitory computer-readable storage medium. The CPT structure may include a first secure certification provenance document (SPCD) structure representing a root node of the hierarchy of components of the device and comprising a first field that stores a certification proof indicating that security properties of the device as a whole have been certified by a certification authority. The CPT structure may further include one or more accreditation information fields, wherein each accreditation information field may (i) store a pointer to an SCPD structure of a component at a first layer of the hierarchy of components of the device; and (ii) provide an indication of assurance that the component will perform securely within the device. Each SCPD of a component of the first layer of the hierarchy of components of the device may comprise a first field that stores a certification proof indicating that security properties of the component have been certified by a certification authority. Each SCPD of a component of the first layer may further comprise zero or more accreditation information fields, wherein each accreditation information field (i) stores a pointer to an SCPD structure of a component at a next layer of the hierarchy of components of the device; and (ii) provides an indication of assurance that the component at that next layer will perform securely within this component at the first layer. Further, each SCPD of a component at said next layer of the hierarchy of components of the device comprises a first field that stores a certification proof indicating that security properties of the component at that next layer have been certified by a certification authority. Each SCPD of a component at said next layer of the hierarchy of components of the device further comprises zero or more accreditation information fields, wherein each accreditation information field stores (i) a pointer to an SCPD structure of a component at a next subsequent layer of the hierarchy of components of the device; and (ii) provides an indication of assurance that the component at that next subsequent layer will perform securely within this component at said next layer. It will be understood that an SCPD structure may include a pointer to another SCPD structure until the SCPD structure is disposed at a bottom layer of the CPT structure.

In order to validate the security of a device, for example, the CPT structure 100 may be traversed at a platform validation time to determine the trustworthiness of the tested device or any of its components. In accordance with an example embodiment, a CPT structure that represents a UE is traversed in response to the UE requesting access to a network that is controlled by a mobile network operator (MNO). Thus, the platform validation time may refer to the an event in which the UE requests access to the network. In response to the request for access, the MNO may request an evaluation of the CPT structure for the UE. The MNO, a certification authority, a third party, or the like, or a combination thereof, may traverse the hierarchy of the SCPD structures using pointers until the security properties of the UE are verified. In accordance with an example embodiment, the MNO that controls the network traverses the hierarchy of SCPD structures, and in response to traversing the hierarchy until the security properties of the UE are verified, the MNO grants the UE access to the network. In another example embodiment, the MNO may request that an evaluation of the CPT structure for the device, for example from a trusted third party. The MNO may receive an indication (e.g., from the trusted third party) that the security properties of the UE are verified. Based on the indication that the security properties of the UE are verified, the MNO may grant the device access to the network.

Figure 3:
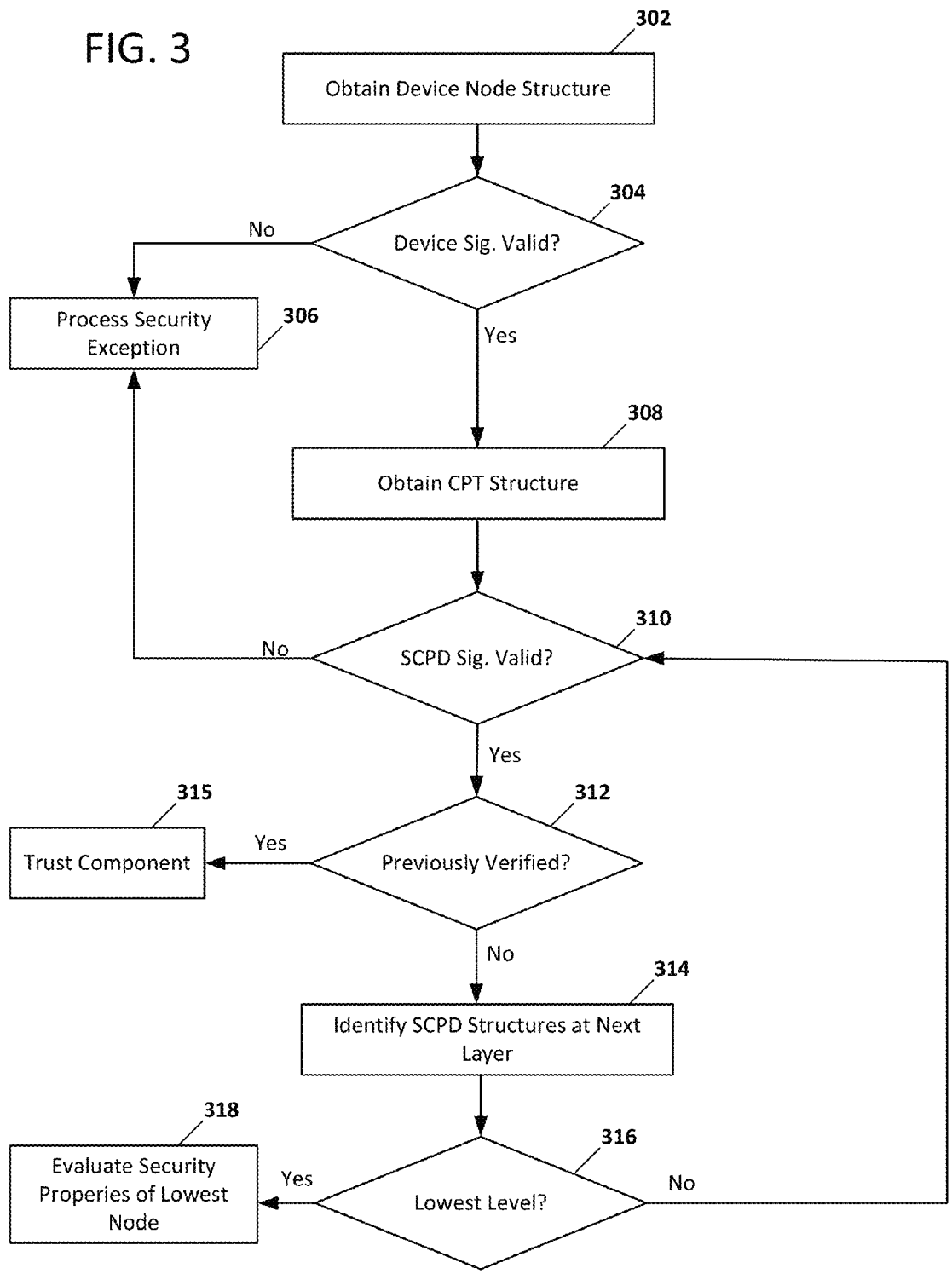
FIG. 3 is a flow diagram for traversing the CPT structure in accordance with an example embodiment.

FIG. 3 is a flow diagram for traversing a portion of a CPT structure, such as the CPT structure 100 for example, in accordance with an example embodiment. In particular, FIG. 3 shows a flow diagram for validating the CPT structure, and thus the device that the CPT structure represents, through recursive inspection of the SCPD structures. Referring to the illustrated embodiment shown in FIG. 3, at 302, the device node structure 202 is obtained. In accordance with the example embodiment in which an MNO requests an evaluation of a UE so that the UE can receive access to a network that is controlled by the MNO, the MNO may obtain the device node structure 202. It will be understood that the device node structure 202 may be obtained from the UE, a server that is managed by a manufacturer of the UE, a trusted third party server, or the like. At 304, a signature in the third field 208 is checked. If the signature is not verified, for example because the signature is not authentic, then a security exception is discovered and the security exception is processed at 306. In accordance with an example embodiment, security exceptions are processed in accordance with a policy of the MNO. For example, the MNO may deny the UE access to the network or the MNO may grant the UE limited access to the network when the security exception is processed. Although the illustrated embodiment is described in terms of an MNO granting the UE access to the network, it will be understood that the described security verification may be performed for any reason as desired, for example for a mobile device to receive access to a service provider (e.g., website). If the signature of the device node structure 202 is verified, the CPT structure 100 may be obtained, at 308, using the pointer in the fourth field 210 of the illustrated device node structure 202. In particular, the root SCPD structure 108*a* is obtained, and the device node structure 202 is cryptographically bound to the root SCPD structure 108*a*.

With continuing reference to FIG. 3, at 310, the signature that is included in a given SCPD structure 108 (e.g., SCPD structure 108*a*) is evaluated. If the signature is not verified or valid, for example because the signature is not authentic, then a security exception is discovered and the security exception is processed at 306, as described above. If the signature is verified, at 312, it is determined whether the given component that the given SCPD structure 108 (e.g., root SCPD structure 108*a*) has been previously verified such that the security properties of the component that the root SCPD structure 108*a* represents are sufficiently trusted. When it is determined that the root SCPD structure 108*a* has not been previously verified, the pointers of the root SCPD structure 108*a* are used to iteratively identify the SCPD structures (at 314) at the next layer (e.g., SCPD structures 108*a-c*) that should be evaluated. When it is determined that the component that the root SCPD structure 108*a* represents has been previously verified, it is determined that the security properties of the component may be trusted, and thus the component is trusted at 315. It is determined whether another component at a given layer has been previously verified until all of the components at the given level have been verified or until a security exception is discovered.

After the SCPD structures at the next layer are identified at 314, they may be evaluated at 316 to determine whether they are disposed at a lowest level of the hierarchy of components. If a given SCPD structure is not disposed at the lowest level, the process returns to step 310 where the signature of the given SCPD structure is evaluated. If the given SCPD structure is identified as representing a component that is disposed at a lowest level of the hierarchy of components, the security properties of the component at the lowest level are evaluated at 318. Successful evaluation of the security properties may include, for example, determining that the certification proof in the first field 202 is authentic and determining that the certification authority that certified the security properties of the component at the lowest level is a trusted certification authority. Thus, as described above, the hierarchy of SCPD structures 108 may be traversed using the pointers stored in the SCPD structures until the security properties of the UE are verified or until a security exception is discovered.

It will be understood that, at 312, when it is determined that a given component represented by a given SCPD structure has been previously verified, there may be no need to verify the subcomponents of the given component. Similarly, if the component that the root SCPD structure 108*a* represents has been previously verified, the UE may be considered verified without any traversal of the underlying CPT structure 100 because the root SCPD structure may represent the security properties of the entire UE. Such a UE verification may increase efficiency, for example, when the network has to validate a large quantity of devices that have the substantially the same or identical security properties. For example, once one of the devices of a group of substantially identical devices is successfully validated, the other devices in the group may be safely marked as validated per the device validation policy.

By way of example, in order to enable a white box view of the security architecture associated with the Qualcomm Snapdragon S4 architecture, specific hardware and software certification may occur. The combination of hardware and software certifications may provide a foundational trusted environment for subsequent SoCs to be built on. The certification of the individual SoCs may become less daunting once the basic trust module has been certified. The final mobile platform certification may then build on the two previous certifications. Thus, incorporating layered certification may reduce cost and time to market for new products.

Figure 4:
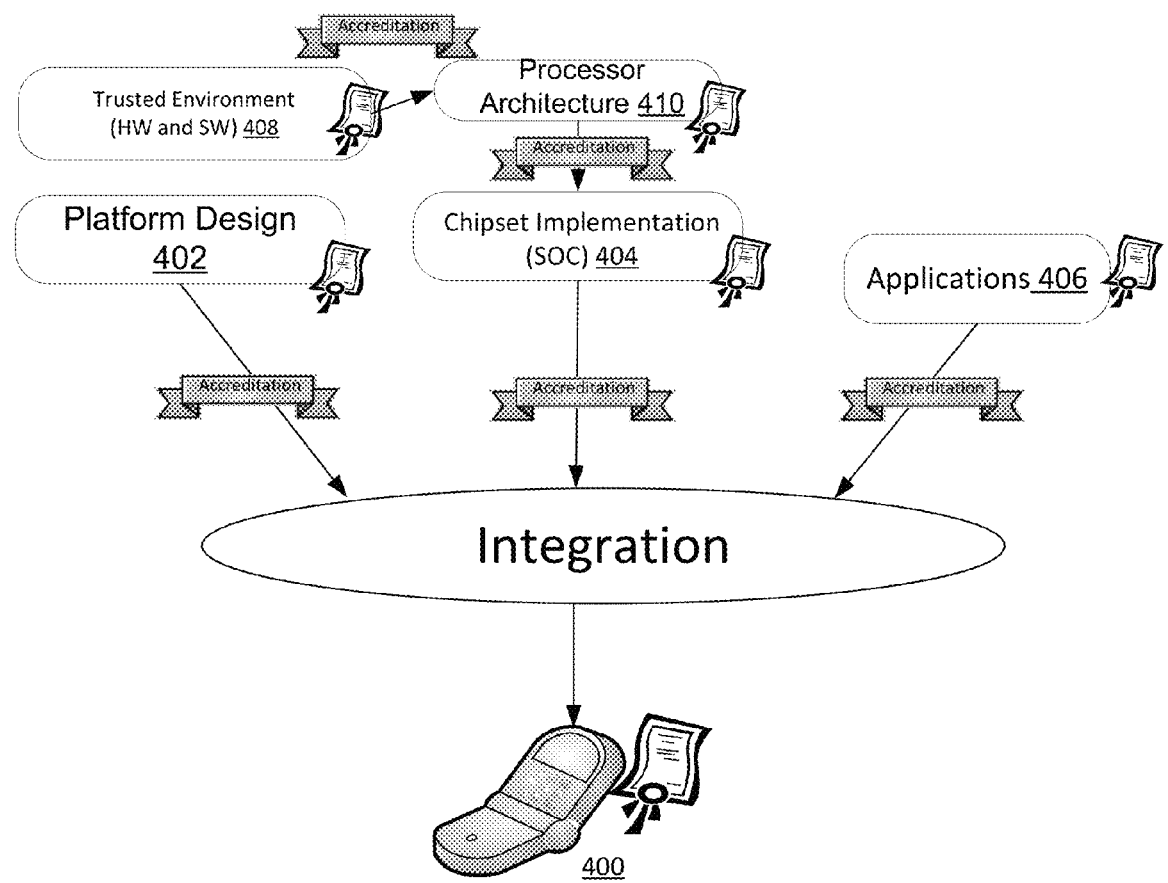
FIG. 4 is a system diagram showing an example user equipment (UE) and its components arranged in a hierarchy that may be certified and accredited in accordance with an example embodiment.

Referring to FIG. 4, a UE 400 may comprise hardware and software components of a trusted environment 410, and the UE 400 may be certified once in accordance with the embodiments described with reference to FIGS. 1-3. For example, the UE 400 may be represented by a root SCPD structure. The UE 400 may comprise a platform 402, a chipset implementation 404, and applications 406 that are disposed at a next level in the hierarchy of a CPT structure that represents the UE 400. The chipset implementation 404 may consist of a processor architecture 408, and the processor architecture may consist of the trusted environment 410. Thus, as described above, the trusted environment 410 may be accredited for use in the processor architecture 408, and the processor architecture 408 may be accredited for use in the chipset implementation 406. Each of the platform 402, the chipset implementation 404, and the applications 406 may be accredited for using the environment of the UE 400 such that the security properties of the UE 400 can be verified by verifying the root SCPD structure that represents the UE 400

In an example embodiment, a device manufacturer (e.g., wireless device manufacturer) may accredit and integrate the certified chipset implementation 406, platform design 402, and applications 408 to produce a final certified mobile device 400 (or network element) that may provide a white box view of the platform, for example, by providing the various certificate information at each layer. For example, at the lowest layer, the trust module certification may provide the network with information regarding the security architecture of the platform SoC, which may comprise details on security architecture, hardware root of trust, cryptographic operations including integrity checking and ciphering, secure code operation, storage and caching, or the like. As described above, additional layers may be built on top of the lowest basic layer to create a layered model of an entire device/platform. In one example embodiment, the information available from a white box view of the platform may enable the network operators to glean trust assurances as to whether a device is operating in a trustworthy manner or not, and to perform service delivery, access control, or authorization decisions based on the reported information.

In accordance with another example embodiment, a device manufacturer may provide information concerning the security capabilities of a device with respect to sensors and/or other resources available to authenticate a user of the device. Such information may enable external entities to gain a level of trust in regards to authentication claims that the device makes when, for example, the user is authenticated locally with the device or with network assistance. For example, if a device performs biometric authentication, the resources on the device that are used for the authentication operations may create an external view of the level of trust that can be gleaned by an external entity. In particular, how the resources are used and the security of the authentication operations may create a measure of the level of trust that can be evaluated by an external entity. Thus, authentication functions (e.g., biometric authentications) that are performed on the device can be monitored and protected from a variety of security threats.

By way of example, a security evaluation may involve verification of the binding of the component's identity with its CPT structure, inspection of the component's SCPDs, and inspection of certificates/accreditation parameters recorded in the CPT structure, for example, to gain a white box view of the security architecture of an entire platform that is represented by the CPT structure. It will be understood that this hierarchical approach enables derivative products to be designed from the same fundamental components and enables the re-use of certifications/accreditation. In accordance with an example embodiment, components are re-certified if one of their a subcomponents changes. For example, changing a sub-component or re-certifying a sub-node may warrant issuance of a new SCPD for each affected node in the tree. It will be understood that a similar process may be pursued for the software components of the platform as hardware components. Additionally, while the examples are presented herein in the context of a mobile phone platform, it will be understood that the embodiments may be implemented concepts to any appropriate system including, for example, network nodes such as servers, eNB, Femto Cells, or the like.

Figure 5A:
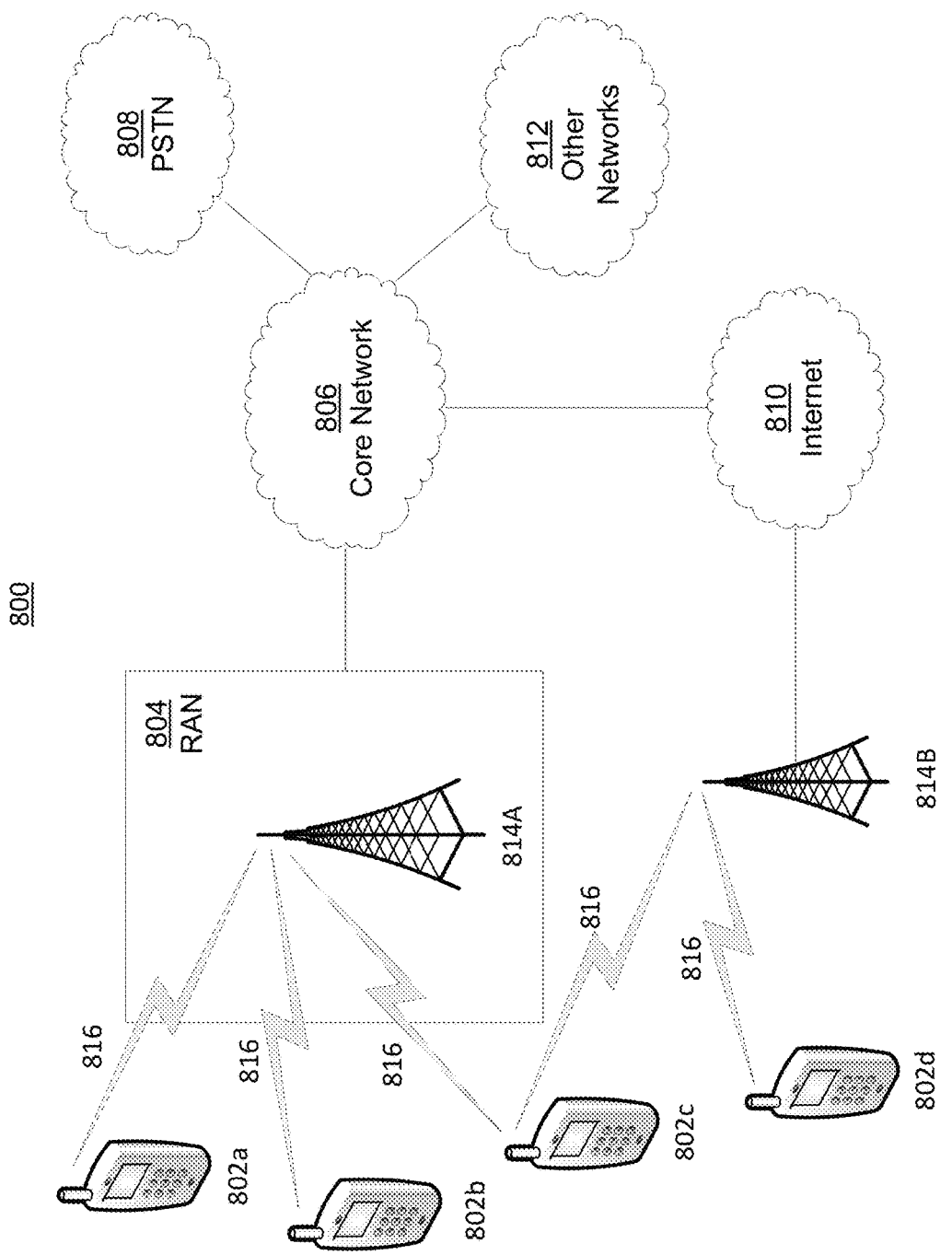
FIG. 5A is a system diagram of an example communications system in which one or more disclosed embodiments may be implemented.

FIG. 5A is a diagram of an example communications system 800 in which one or more disclosed embodiments may be implemented. The communications system 800 may be a multiple access system that provides content, such as voice, data, video, messaging, broadcast, etc., to multiple wireless users. The communications system 800 may enable multiple wireless users to access such content through the sharing of system resources, including wireless bandwidth. For example, the communications systems 800 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 5A, the communications system 800 may include wireless transmit/receive units (WTRUs) 802a, 802b, 802c, 802d, a radio access network (RAN) 804, a core network 806, a public switched telephone network (PSTN) 808, the Internet 810, and other networks 812, though it will be appreciated that the disclosed embodiments contemplate any number of WTRUs, base stations, networks, and/or network elements. As described above, the CPT structure may be stored on any of the WTRUs 802 in accordance with an example embodiment. Each of the WTRUs 802a, 802b, 802c, 802d may be any type of device configured to operate and/or communicate in a wireless environment. By way of example, the WTRUs 802a, 802b, 802c, 802d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 800 may also include a base station 814a and a base station 814b. Each of the base stations 814a, 814b may be any type of device configured to wirelessly interface with at least one of the WTRUs 802a, 802b, 802c, 802d to facilitate access to one or more communication networks, such as the core network 806, the Internet 810, and/or the networks 812. By way of example, the base stations 814a, 814b may be a base transceiver station (BTS), a Node-B, an eNode B, a Home Node B, a Home eNode B, a site controller, an access point (AP), a wireless router, and the like. While the base stations 814a, 814b are each depicted as a single element, it will be appreciated that the base stations 814a, 814b may include any number of interconnected base stations and/or network elements.

The base station 814a may be part of the RAN 804, which may also include other base stations and/or network elements (not shown), such as a base station controller (BSC), a radio network controller (RNC), relay nodes, etc. The base station 814a and/or the base station 814b may be configured to transmit and/or receive wireless signals within a particular geographic region, which may be referred to as a cell (not shown). The cell may further be divided into cell sectors. For example, the cell associated with the base station 814a may be divided into three sectors. Thus, in an embodiment, the base station 814a may include three transceivers, i.e., one for each sector of the cell. In an embodiment, the base station 814a may employ multiple-input multiple output (MIMO) technology and, therefore, may utilize multiple transceivers for each sector of the cell.

The base stations 814a, 814b may communicate with one or more of the WTRUs 802a, 802b, 802c, 802d over an air interface 816, which may be any suitable wireless communication link (e.g., radio frequency (RF), microwave, infrared (IR), ultraviolet (UV), visible light, etc.). The air interface 816 may be established using any suitable radio access technology (RAT).

More specifically, as noted above, the communications system 800 may be a multiple access system and may employ one or more channel access schemes, such as CDMA, TDMA, FDMA, OFDMA, SC-FDMA, and the like. For example, the base station 814a in the RAN 804 and the WTRUs 802a, 802b, 802c may implement a radio technology such as Universal Mobile Telecommunications System (UMTS) Terrestrial Radio Access (UTRA), which may establish the air interface 816 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 814a and the WTRUs 802a, 802b, 802c may implement a radio technology such as Evolved UMTS Terrestrial Radio Access (E-UTRA), which may establish the air interface 816 using Long Term Evolution (LTE) and/or LTE-Advanced (LTE-A).

In other embodiments, the base station 814a and the WTRUs 802a, 802b, 802c may implement radio technologies such as IEEE 1002.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 814b in FIG. 5A may be a wireless router, Home Node B, Home eNode B, femto cell base station, or access point, for example, and may utilize any suitable RAT for facilitating wireless connectivity in a localized area, such as a place of business, a home, a vehicle, a campus, and the like. In an embodiment, the base station 814b and the WTRUs 802c, 802d may implement a radio technology such as IEEE 802.11 to establish a wireless local area network (WLAN). In an embodiment, the base station 814b and the WTRUs 802c, 802d may implement a radio technology such as IEEE 802.15 to establish a wireless personal area network (WPAN). In yet an embodiment, the base station 814b and the WTRUs 802c, 802d may utilize a cellular-based RAT (e.g., WCDMA, CDMA2000, GSM, LTE, LTE-A, etc.) to establish a picocell or femtocell. As shown in FIG. 5A, the base station 814b may have a direct connection to the Internet 810. Thus, the base station 814b may not be required to access the Internet 810 via the core network 806.

The RAN 804 may be in communication with the core network 806, which may be any type of network configured to provide voice, data, applications, and/or voice over internet protocol (VoIP) services to one or more of the WTRUs 802a, 802b, 802c, 802d. For example, the core network 806 may provide call control, billing services, mobile location-based services, pre-paid calling, Internet connectivity, video distribution, etc., and/or perform high-level security functions, such as user authentication. Although not shown in FIG. 5A, it will be appreciated that the RAN 804 and/or the core network 806 may be in direct or indirect communication with other RANs that employ the same RAT as the RAN 804 or a different RAT. For example, in addition to being connected to the RAN 804, which may be utilizing an E-UTRA radio technology, the core network 806 may also be in communication with another RAN (not shown) employing a GSM radio technology.

The core network 806 may also serve as a gateway for the WTRUs 802a, 802b, 802c, 802d to access the PSTN 808, the Internet 810, and/or other networks 812. The PSTN 808 may include circuit-switched telephone networks that provide plain old telephone service (POTS). The Internet 810 may include a global system of interconnected computer networks and devices that use common communication protocols, such as the transmission control protocol (TCP), user datagram protocol (UDP) and the internet protocol (IP) in the TCP/IP internet protocol suite. The networks 812 may include wired or wireless communications networks owned and/or operated by other service providers. For example, the networks 812 may include another core network connected to one or more RANs, which may employ the same RAT as the RAN 804 or a different RAT.

Some or all of the WTRUs 802a, 802b, 802c, 802d in the communications system 800 may include multi-mode capabilities, i.e., the WTRUs 802a, 802b, 802c, 802d may include multiple transceivers for communicating with different wireless networks over different wireless links. For example, the WTRU 802c shown in FIG. 5A may be configured to communicate with the base station 814a, which may employ a cellular-based radio technology, and with the base station 814b, which may employ an IEEE 802 radio technology.

Figure 5B:
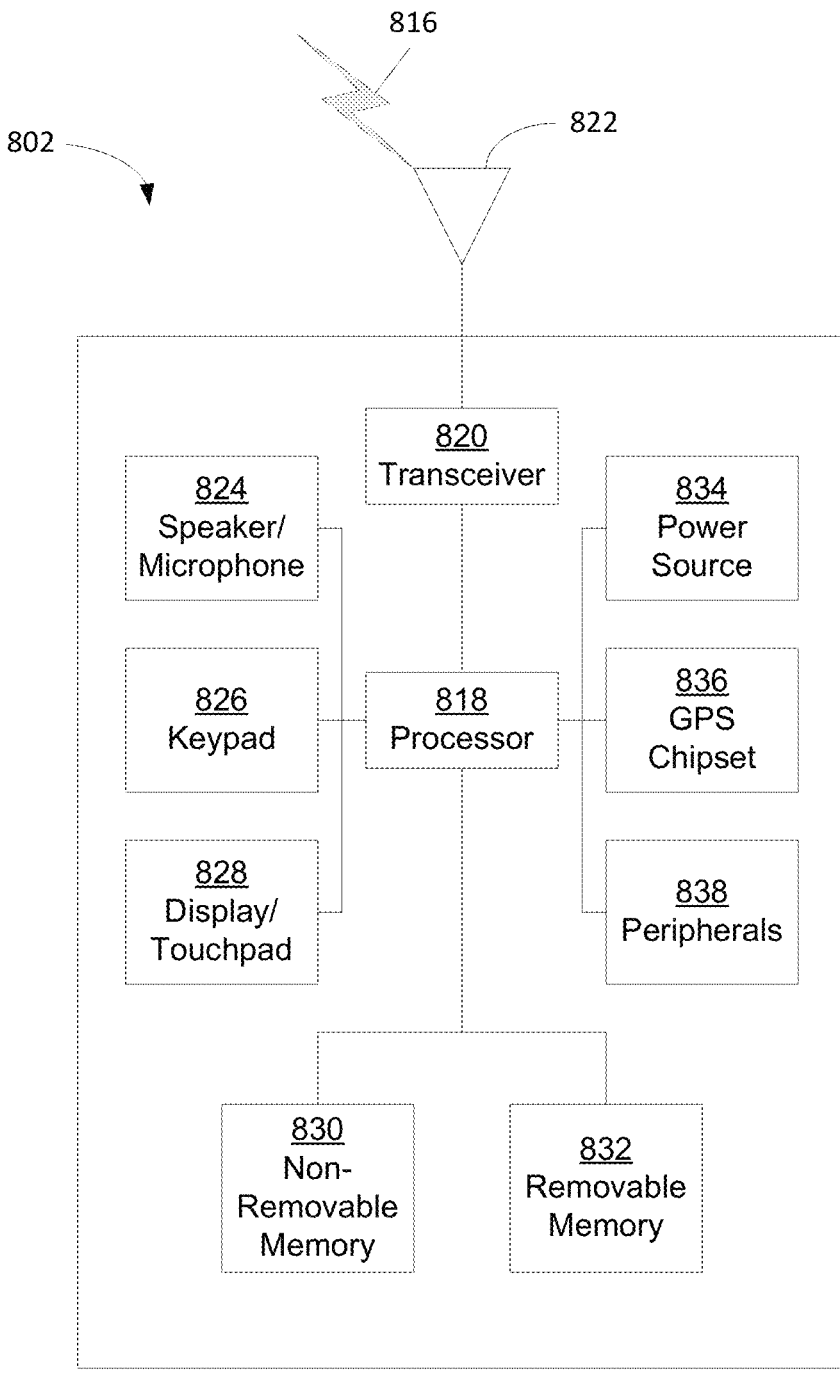
FIG. 5B is a system diagram of an example wireless transmit/receive unit (WTRU) that may be used within the communications system illustrated in FIG. 5A.

FIG. 5B is a system diagram of an example WTRU 802. In an example embodiment, the WTRU 802 may include a computer-readable medium on which is stored a certification provenance tree structure, for example the CPT structure 100, for providing information concerning a layered certification of the WTRU 802 that comprises a hierarchy of components. As shown in FIG. 5B, the WTRU 802 may include a processor 818, a transceiver 820, a transmit/receive element 822, a speaker/microphone 824, a keypad 826, a display/touchpad 828, non-removable memory 830, removable memory 832, a power source 834, a global positioning system (GPS) chipset 836, and other peripherals 838. It will be appreciated that the WTRU 802 may include any sub-combination of the foregoing elements while remaining consistent with an embodiment.

The processor 818 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 818 may perform signal coding, data processing, power control, input/output processing, and/or any other functionality that enables the WTRU 802 to operate in a wireless environment. The processor 818 may be coupled to the transceiver 820, which may be coupled to the transmit/receive element 822. While FIG. 5B depicts the processor 818 and the transceiver 820 as separate components, it will be appreciated that the processor 818 and the transceiver 820 may be integrated together in an electronic package or chip. The processor 818 may perform application-layer programs (e.g., browsers) and/or radio access-layer (RAN) programs and/or communications. The processor 818 may perform security operations such as authentication, security key agreement, and/or cryptographic operations, such as at the access-layer and/or application layer for example.

The transmit/receive element 822 may be configured to transmit signals to, or receive signals from, a base station (e.g., the base station 814a) over the air interface 816. For example, in an embodiment, the transmit/receive element 822 may be an antenna configured to transmit and/or receive RF signals. In an embodiment, the transmit/receive element 822 may be an emitter/detector configured to transmit and/or receive IR, UV, or visible light signals, for example. In yet another embodiment, the transmit/receive element 822 may be configured to transmit and receive both RF and light signals. It will be appreciated that the transmit/receive element 822 may be configured to transmit and/or receive any combination of wireless signals.

In addition, although the transmit/receive element 822 is depicted in FIG. 5B as a single element, the WTRU 802 may include any number of transmit/receive elements 822. More specifically, the WTRU 802 may employ MIMO technology. Thus, in an embodiment, the WTRU 802 may include two or more transmit/receive elements 822 (e.g., multiple antennas) for transmitting and receiving wireless signals over the air interface 816.

The transceiver 820 may be configured to modulate the signals that are to be transmitted by the transmit/receive element 822 and to demodulate the signals that are received by the transmit/receive element 822. As noted above, the WTRU 802 may have multi-mode capabilities. Thus, the transceiver 820 may include multiple transceivers for enabling the WTRU 802 to communicate via multiple RATs, such as UTRA and IEEE 802.11, for example.

The processor 818 of the WTRU 802 may be coupled to, and may receive user input data from, the speaker/microphone 824, the keypad 826, and/or the display/touchpad 828 (e.g., a liquid crystal display (LCD) display unit or organic light-emitting diode (OLED) display unit). The processor 818 may also output user data to the speaker/microphone 824, the keypad 826, and/or the display/touchpad 828. In addition, the processor 818 may access information from, and store data in, any type of suitable memory, such as the non-removable memory 830 and/or the removable memory 832. The non-removable memory 830 may include random-access memory (RAM), read-only memory (ROM), a hard disk, or any other type of memory storage device. The removable memory 832 may include a subscriber identity module (SIM) card, a memory stick, a secure digital (SD) memory card, and the like. In other embodiments, the processor 818 may access information from, and store data in, memory that is not physically located on the WTRU 802, such as on a server or a home computer (not shown).

The processor 818 may receive power from the power source 834, and may be configured to distribute and/or control the power to the other components in the WTRU 802. The power source 834 may be any suitable device for powering the WTRU 802. For example, the power source 834 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 818 may also be coupled to the GPS chipset 836, which may be configured to provide location information (e.g., longitude and latitude) regarding the current location of the WTRU 802. In addition to, or in lieu of, the information from the GPS chipset 836, the WTRU 802 may receive location information over the air interface 816 from a base station (e.g., base stations 814a, 814b) and/or determine its location based on the timing of the signals being received from two or more nearby base stations. It will be appreciated that the WTRU 802 may acquire location information by way of any suitable location-determination method while remaining consistent with an embodiment.

The processor 818 may further be coupled to other peripherals 838, which may include one or more software and/or hardware modules that provide additional features, functionality and/or wired or wireless connectivity. For example, the peripherals 838 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 5C:
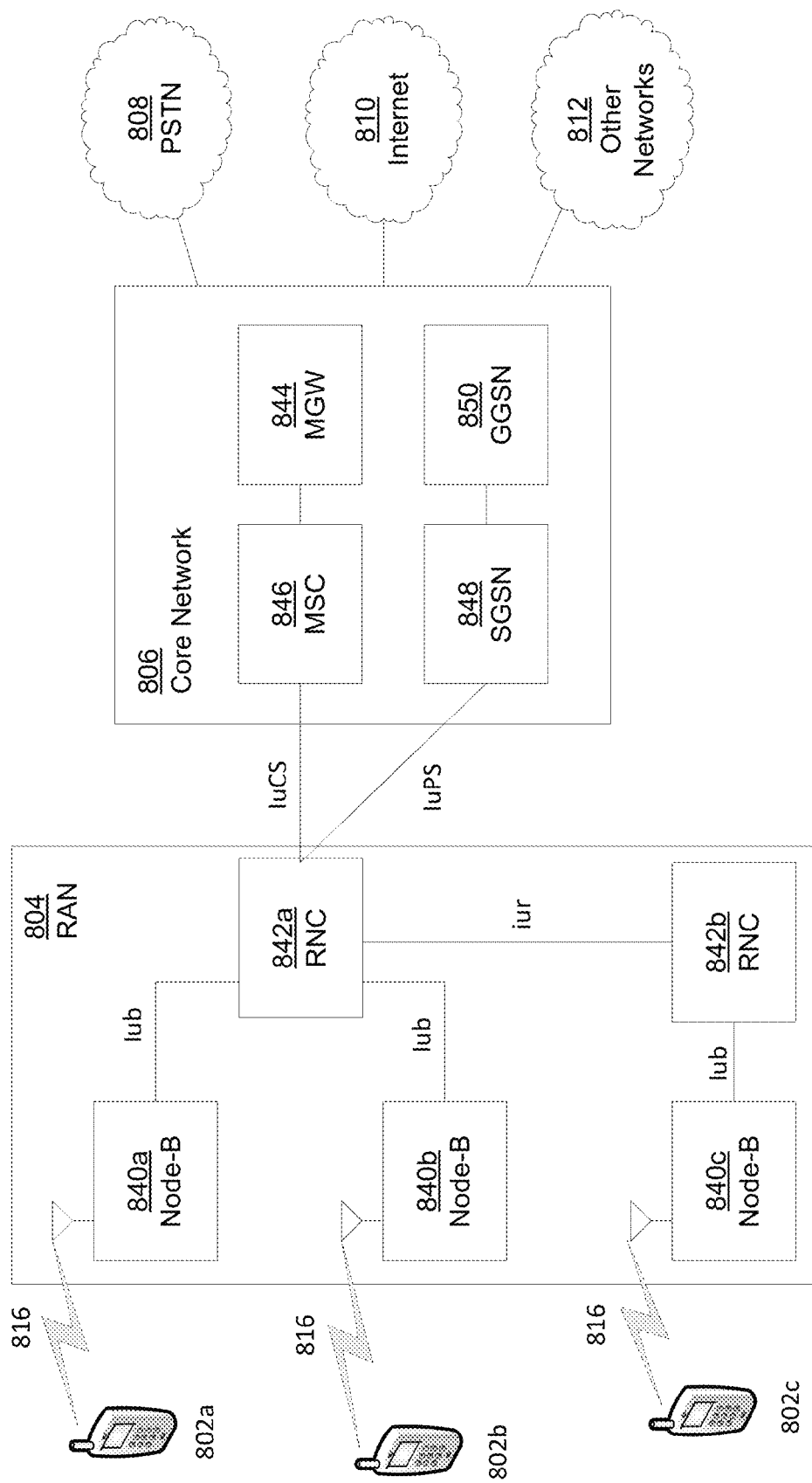
FIG. 5C is a system diagram of an example radio access network and an example core network that may be used within the communications system illustrated in FIG. 5A.

FIG. 5C is a system diagram of the RAN 804 and the core network 806 according to an embodiment. As noted above, the RAN 804 may employ a UTRA radio technology to communicate with the WTRUs 802a, 802b, 802c over the air interface 816. The RAN 804 may also be in communication with the core network 806. As shown in FIG. 5C, the RAN 804 may include Node-Bs 840a, 840b, 840c, which may each include one or more transceivers for communicating with the WTRUs 802a, 802b, 802c over the air interface 816. The Node-Bs 840a, 840b, 840c may each be associated with a particular cell (not shown) within the RAN 804. The RAN 804 may also include RNCs 842a, 842b. It will be appreciated that the RAN 804 may include any number of Node-Bs and RNCs while remaining consistent with an embodiment.

As shown in FIG. 5C, the Node-Bs 840a, 840b may be in communication with the RNC 842a. Additionally, the Node-B 840c may be in communication with the RNC 842b. The Node-Bs 840a, 840b, 840c may communicate with the respective RNCs 842a, 842b via an Iub interface. The RNCs 842a, 842b may be in communication with one another via an Iur interface. Each of the RNCs 842a, 842b may be configured to control the respective Node-Bs 840a, 840b, 840c to which it is connected. In addition, each of the RNCs 842a, 842b may be configured to carry out and/or support other functionality, such as outer loop power control, load control, admission control, packet scheduling, handover control, macrodiversity, security functions, data encryption, and the like.

The core network 806 shown in FIG. 5C may include a media gateway (MGW) 844, a mobile switching center (MSC) 846, a serving GPRS support node (SGSN) 848, and/or a gateway GPRS support node (GGSN) 850. While each of the foregoing elements are depicted as part of the core network 806, it will be appreciated that any one of these elements may be owned and/or operated by an entity other than the core network operator.

The RNC 842a in the RAN 804 may be connected to the MSC 846 in the core network 806 via an IuCS interface. The MSC 846 may be connected to the MGW 844. The MSC 846 and the MGW 844 may provide the WTRUs 802a, 802b, 802c with access to circuit-switched networks, such as the PSTN 808, to facilitate communications between the WTRUs 802a, 802b, 802c and traditional land-line communications devices.

The RNC 842a in the RAN 804 may also be connected to the SGSN 848 in the core network 806 via an IuPS interface. The SGSN 848 may be connected to the GGSN 850. The SGSN 848 and the GGSN 850 may provide the WTRUs 802a, 802b, 802c with access to packet-switched networks, such as the Internet 810, to facilitate communications between and the WTRUs 802a, 802b, 802c and IP-enabled devices.

As noted above, the core network 806 may also be connected to the networks 812, which may include other wired or wireless networks that are owned and/or operated by other service providers.

Although features and elements are described above in particular combinations, each feature or element may be used alone or in any combination with the other features and elements. Additionally, the embodiments described herein are provided for exemplary purposes only. Furthermore, the embodiments described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of assessing security properties of a device that comprises a hierarchy of components, the method comprising:

retrieving a certification provenance tree structure from a non-transitory computer-readable storage medium to obtain information concerning a layered certification of the device;

traversing the certification provenance tree structure until the security properties of the device are verified or until a security exception is discovered, the certification provenance tree structure comprising:

a hierarchy of secure certification provenance document (SCPD) structures, each SCPD structure representing a given component of the device, each SCPD structure comprising:

a first field that stores a certification proof indicating that security properties of the given component at that given level of the hierarchy have been certified by a certification authority; and zero or more accreditation information fields, each accreditation information field storing a pointer to an SCPD structure of a component at a next level of the hierarchy of components of the device and providing an indication of assurance that the component at that next level will perform securely within this component at said given level, wherein at least one on the SCPD structures includes at least one of the accreditation information fields, such that the component associated with the at least one SCPD structure is verified as performing securely within its deployment environment;

retrieving a device node structure comprising a first field that stores an identity of the device, a second field that stores an identity of a manufacturer of the device, a third field that stores a device certificate signed by the manufacturer of the device or a certification authority, and a fourth field that provides a pointer to a root SCPD structure of the SCPD structures that represents a root node of the hierarchy of components of the device; and when the security exception is discovered, denying the device from accessing a service or network.

2. The method claim 1, wherein the device node structure is retrieved from the device and the certification provenance tree structure is retrieved from outside of the device, and wherein the device node structure is cryptographically bound to the root SCPD structure via the fourth field that provides the pointer to the root SCPD structure.

3. The method of claim 1, wherein at least a portion of certification provenance tree structure is cryptographically bound to the device.

4. The method of claim 1, wherein the device includes the non-transitory computer-readable medium such that the certificate provenance tree structure is stored on the device.

5. The method of claim 1, wherein each component in the hierarchy of components is at least one of a software component or a hardware component.

6. The method of claim 1, wherein the certification authority is a manufacturer of the device.

7. The method of claim 1, wherein the certification authority is the manufacturer or developer of the given component that has been certified by the certification authority.

8. The method of claim 1, wherein the device is a user equipment for accessing the network that is controlled by a mobile network operator.

* * * * *